(12) United States Patent
Tan et al.

(10) Patent No.: US 10,822,017 B2
(45) Date of Patent: Nov. 3, 2020

(54) INTEGRATED AUTO-STEER SYSTEM FOR VEHICLE

(71) Applicant: AGJUNCTION LLC, Hiawatha, KS (US)

(72) Inventors: Jim Tan, Cupertino, CA (US); Alan Robert Joughin, Union City, CA (US); Jean-Marie Eichner, Sunnyvale, CA (US); Glen Sapilewski, Emerald Hills, CA (US); Andreas F. Ramm, Woolloongabba (AU); Husam Kal, San Ramon, CA (US)

(73) Assignee: AGJUNCTION LLC, Scottsdale, AZ (US)

( * ) Notice: Subject to any disclaimer, the term of this patent is extended or adjusted under 35 U.S.C. 154(b) by 236 days.

(21) Appl. No.: 15/878,849

(22) Filed: Jan. 24, 2018

(65) Prior Publication Data
US 2018/0148085 A1 May 31, 2018

Related U.S. Application Data

(63) Continuation-in-part of application No. 15/784,804, filed on Oct. 16, 2017, now Pat. No. 10,384,709.
(Continued)

(51) Int. Cl.
*B62D 5/02* (2006.01)
*B62D 5/00* (2006.01)
(Continued)

(52) U.S. Cl.
CPC ............ *B62D 5/006* (2013.01); *B60W 40/10* (2013.01); *B60W 50/08* (2013.01); *B62D 1/00* (2013.01);
(Continued)

(58) Field of Classification Search
CPC ......... B62D 5/006; B62D 5/0409; B62D 5/04
(Continued)

(56) References Cited

U.S. PATENT DOCUMENTS 3,003,363 A 10/1961 DeHart
4,681,055 A 7/1987 Cyr
(Continued)

FOREIGN PATENT DOCUMENTS

| CN | 203812091 U | 9/2014 |
|---|---|---|
| EP | 1787889 A1 | 5/2007 |
| WO | 1995015499 A1 | 6/1995 |

OTHER PUBLICATIONS

Noh, Kwang-Mo, Self-tuning controller for farm tractor guidance, Iowa State University Retrospective Theses and Dissertations, Paper 9874, (1990).
(Continued)

*Primary Examiner* — Tony H Winner
(74) *Attorney, Agent, or Firm* — Schwabe Williamson & Wyatt (57) ABSTRACT

A steering wheel actuator is attached to a steering wheel column. The steering wheel actuator includes a gear assembly for turning a steering wheel on the steering wheel column, a motor for rotating the gear assembly, and an enclosure. A control system in the enclosure controls the motor to automatically steer the vehicle. The control system may receive global navigation satellite system (GNSS) signals from a GNSS antenna and GNSS receiver located in the enclosure and automatically steer the vehicle based on the GNSS signals. The control system also may receive inertial measurement unit (IMU) signals from an IMU located in the enclosure and automatically steer the vehicle based on the IMU signals. The control system also may receive user input signals from a user interface located on
(Continued)

the enclosure and automatically steer the vehicle based on the user input signals.

27 Claims, 9 Drawing Sheets

Related U.S. Application Data (60) Provisional application No. 62/450,491, filed on Jan. 25, 2017, provisional application No. 62/409,210, filed on Oct. 17, 2016.

(51) Int. Cl.
| | |
|---|---|
| *B60W 40/10* | (2012.01) |
| *B60W 50/08* | (2020.01) |
| *B62D 1/28* | (2006.01) |
| *B62D 5/04* | (2006.01) |
| *B62D 1/00* | (2006.01) |
| *B60W 50/14* | (2020.01) |

(52) U.S. Cl.
CPC .............. *B62D 1/28* (2013.01); *B62D 5/04* (2013.01); *B62D 5/0406* (2013.01); *B62D 5/0409* (2013.01); *B60W 2050/146* (2013.01); *B60W 2510/20* (2013.01); *B60W 2520/00* (2013.01); *B60W 2556/60* (2020.02)

(58) Field of Classification Search
USPC ........................................................ 180/444
See application file for complete search history.

(56) References Cited

U.S. PATENT DOCUMENTS

| | | |
|---|---|---|
| 5,194,851 A | 3/1993 | Kraning et al. |
| 5,390,125 A | 2/1995 | Sennott et al. |
| 5,615,581 A | 4/1997 | Cordioli |
| 5,663,879 A | 9/1997 | Trovato et al. |
| 5,923,270 A | 7/1999 | Sampo et al. |
| 6,052,647 A | 4/2000 | Parkinson et al. |
| 6,070,673 A | 6/2000 | Wendte |
| 6,212,453 B1 | 4/2001 | Kawagoe et al. |
| 6,373,432 B1 | 4/2002 | Rabinowitz et al. |
| 6,377,889 B1 | 4/2002 | Soest |
| 6,445,983 B1 | 9/2002 | Dickson et al. |
| 6,539,303 B2 | 3/2003 | McClure et al. |
| 6,711,501 B2 | 3/2004 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,162,348 B2 | 1/2007 | McClure et al. |
| 7,277,792 B2 | 10/2007 | Overschie |
| 7,373,231 B2 | 5/2008 | McClure et al. |
| 7,400,956 B1 | 7/2008 | Feller et al. |
| 7,431,325 B2 | 10/2008 | Stahle |
| 7,437,230 B2 | 10/2008 | McClure |
| 7,460,942 B2 | 12/2008 | Mailer |
| 7,628,239 B1 | 12/2009 | Louie |
| 7,648,004 B1 | 1/2010 | Larouche |
| 7,689,354 B2 | 3/2010 | Heiniger et al. |
| RE41,358 E | 5/2010 | Heiniger et al. |
| 7,835,832 B2 | 11/2010 | MacDonald et al. |
| 7,885,745 B2 | 2/2011 | McClure et al. |
| 8,018,376 B2 | 9/2011 | McClure et al. |
| 8,190,337 B2 | 5/2012 | McClure |
| 8,214,111 B2 | 7/2012 | Heiniger et al. |
| 8,311,696 B2 | 11/2012 | Reeve |
| 8,386,129 B2 | 2/2013 | Collins et al. |
| 8,401,704 B2 | 3/2013 | Pollock et al. |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 | 1/2014 | Jones et al. |
| 8,649,930 B2 | 2/2014 | Reeve et al. |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 | 7/2014 | McClure |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 | 4/2015 | Jones et al. |
| 9,002,566 B2 | 4/2015 | McClure et al. |
| 9,141,111 B2 | 9/2015 | Webber et al. |
| 9,162,703 B2 | 10/2015 | Miller et al. |
| 9,164,508 B1 | 10/2015 | Takach, Jr. |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 9,996,081 B2 | 6/2018 | Owens |
| 2002/0072850 A1 | 6/2002 | McClure et al. |
| 2004/0186644 A1 | 9/2004 | McClure et al. |
| 2006/0149446 A1 | 7/2006 | Nelson |
| 2006/0167600 A1 | 7/2006 | Nelson, Jr. et al. |
| 2010/0274452 A1 | 10/2010 | Ringwald et al. |
| 2014/0266877 A1 | 9/2014 | McClure |
| 2014/0277676 A1 | 9/2014 | Gattis |
| 2015/0175194 A1 | 6/2015 | Gattis |
| 2016/0039454 A1 | 2/2016 | Mortimer |
| 2016/0154108 A1 | 6/2016 | McClure et al. |
| 2016/0205864 A1 | 7/2016 | Gattis et al. |
| 2016/0214643 A1 | 7/2016 | Joughin et al. |
| 2016/0252909 A1 | 9/2016 | Webber et al. |
| 2016/0334804 A1 | 11/2016 | Webber et al. |
| 2018/0105200 A1 | 4/2018 | Joughin |
| 2018/0201299 A1 | 7/2018 | Ashtari |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).
International Search Report and Written Opinion for PCT/US2018/015003 dated Jan. 24, 2018; 12 pages.
International Preliminary Report on Patentability for PCT/US2018/015003 dated Aug. 8, 2019; 8 pages.
International Search Report and Written Opinion; PCT/US2017/056770; dated Feb. 2, 2018.
"The evolution of portable valve actuators", https://www.linkedin.com/pulse/evolution-portable-valve-actuators-tim-hughes, Jul. 5, 2017, pp. 1-5.
"ATEX Certified Pneumatic Portable Valve Actuator", https://www.totallockout.com/expertise/valve-assist/pneumatic/pneumatic-windygun/, Nov. 2, 2017, pp. 1-7.
International Preliminary Report on Patentability; PCT/US2017/056770; dated May 2, 2019.

INTEGRATED AUTO-STEER SYSTEM FOR VEHICLE

The present application claims priority to U.S. Provisional Patent Application Ser. No. 62/450,491 filed on Jan. 25, 2017, entitled: METHOD AND APPARATUS FOR AN INTEGRATED AUTO STEERING SYSTEM FOR VEHICLE which is herein incorporated by reference in its entirety. The present application is also a continuation-in-part of U.S. patent application Ser. No. 15/784,804 filed Oct. 16, 2017, entitled AN ACTUATOR FOR TURNING A STEERING WHEEL IN AUTOMATIC STEERING SYSTEMS which claims priority to U.S. Provisional Patent Application Ser. No. 62/409,210 filed on Oct. 17, 2016, entitled: SYSTEM FOR TURNING A STEERING WHEEL IN AUTOMATIC STEERING SYSTEM which are all herein incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to an integrated auto steering system for a vehicle.

BACKGROUND

Electric actuators have been developed for automatically turning a steering wheel of an autonomous vehicle. These systems use electric motors and drive mechanisms to turn the steering wheel through friction wheels, gears, belt drives and direct drive motors installed under the steering wheel.

A quick connect system includes a sleeve concentrically received around a steering shaft of the vehicle and a hub concentrically received around and releasably secured to the sleeve by one or more fasteners. Mating non-rotary interfaces are provided between the shaft and sleeve and the hub and the sleeve when the shaft, sleeve, and hub are concentrically arranged relative to one another. The hub is releasably secured by a number of fasteners to a rotatable output member of an auto-steer motor of the steering wheel system. The steering wheel system includes an auto-steer motor that can be installed on the steering shaft of a vehicle not originally equipped with an auto-steer motor.

Another integrated automatic electrical steering system includes a global navigation satellite system (GNSS) receiver and antenna for determining the vehicle's instantaneous position, a guidance CPU, and an automatic steering subsystem integrated with the vehicle electrical power system. The automatic steering subsystem can be interfaced with the steering column of the vehicle. The steering subsystem mechanically activates the steering column steering the vehicle according to instructions received from the CPU based upon the vehicle position and a predetermined path. An interrupt element, such as a wheel movement sensor or a slip gear, will allow manual steering override of the automatic steering control.

Another hydraulic primary steering system includes a guidance module with a GPS receiver and a microprocessor adapted to process and store global positioning system (GPS) data defining travel paths, which can be associated with a cultivated field in an agricultural vehicle application. An automatic steering module is connected to the guidance module and to a steering valve control block, which provides pressurized hydraulic fluid in parallel with the vehicle primary hydrostatic steering system.

All of these steering actuators need several separate components or housings for GPS data reception, GPS based data control, and a user interface with display and keypad.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

An all-in-one auto-steer system steers a farm tractor or any other vehicle along a predetermined path. The auto-steer system integrates processing components into a single unit rather than connecting several separate components together with cables. The end result is overall system simplicity, easy installation, and lower overall system cost.

The auto-steer system may include a steering wheel actuator attached to a steering wheel column. The steering wheel actuator includes a gear assembly for turning a steering wheel on the steering wheel column, a motor for rotating the gear assembly, and an enclosure. A control system operates in the enclosure to control the motor and automatically steer the vehicle.

The control system may receive global navigation satellite system (GNSS) signals from a GNSS antenna and GNSS receiver located in the enclosure and automatically steer the vehicle based on the GNSS signals. The control system also may receive inertial measurement unit (IMU) signals from an IMU located in the enclosure and automatically steer the vehicle based on the IMU signals. The control system also may receive user input signals from a user interface located on the enclosure and automatically steer the vehicle based on the user input signals. In other example systems, the user interface, IMU and/or GNSS may be installed externally to the enclosure and main control unit.

Figure 1:
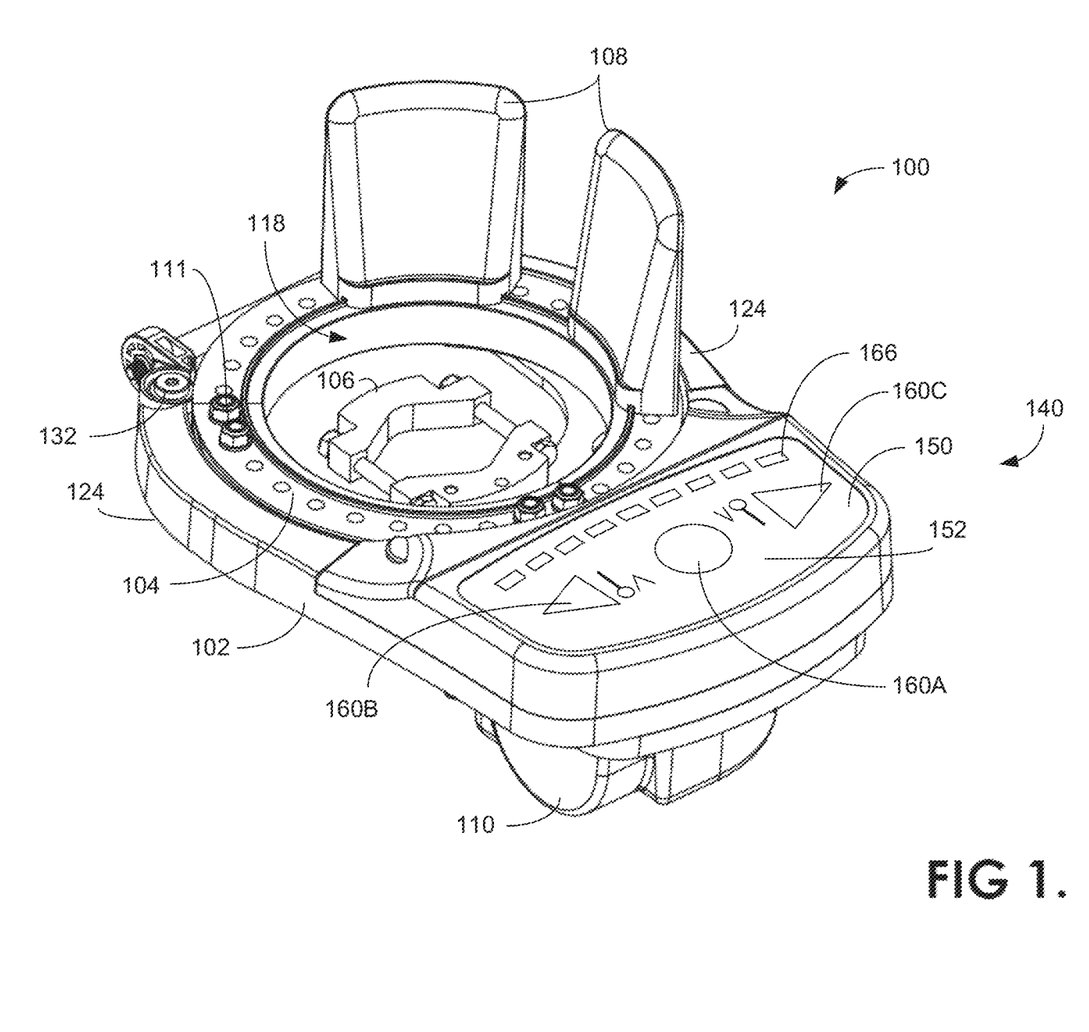
FIG. 1 shows a perspective view of an integrated steering wheel actuator.
Figure 2:
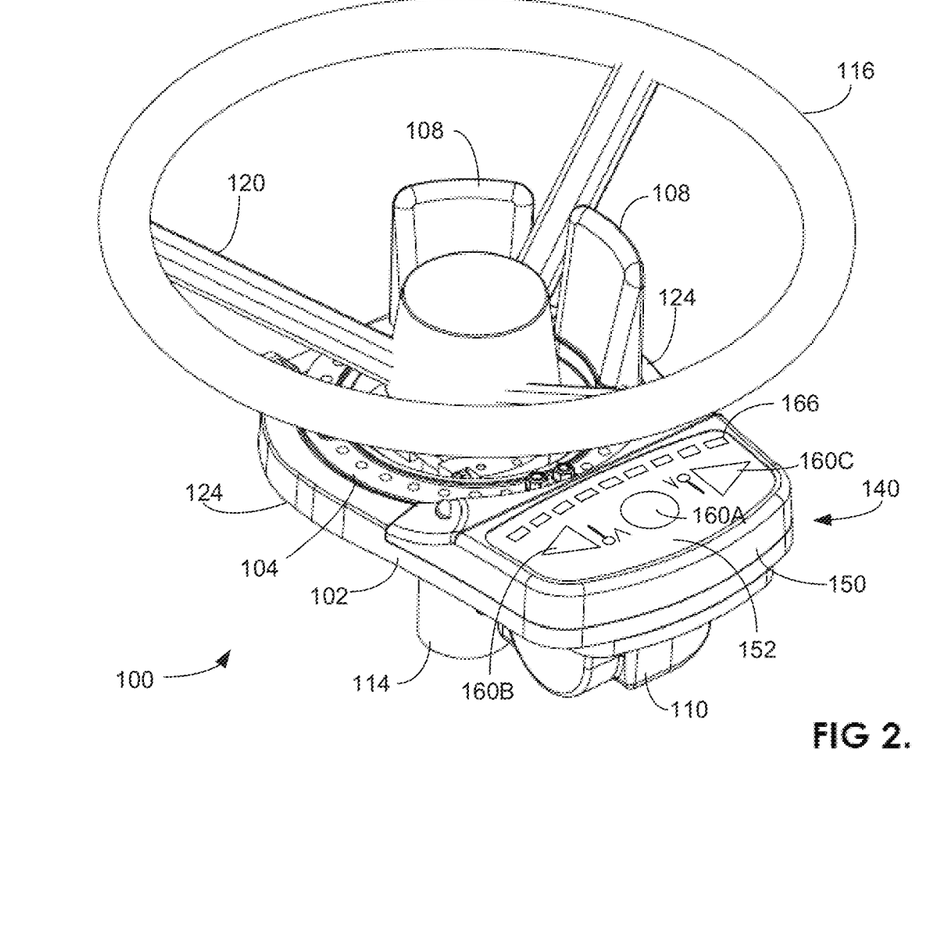
FIG. 2 is a perspective view of the steering wheel actuator of FIG. 1 mounted under a steering wheel.
Figure 3:
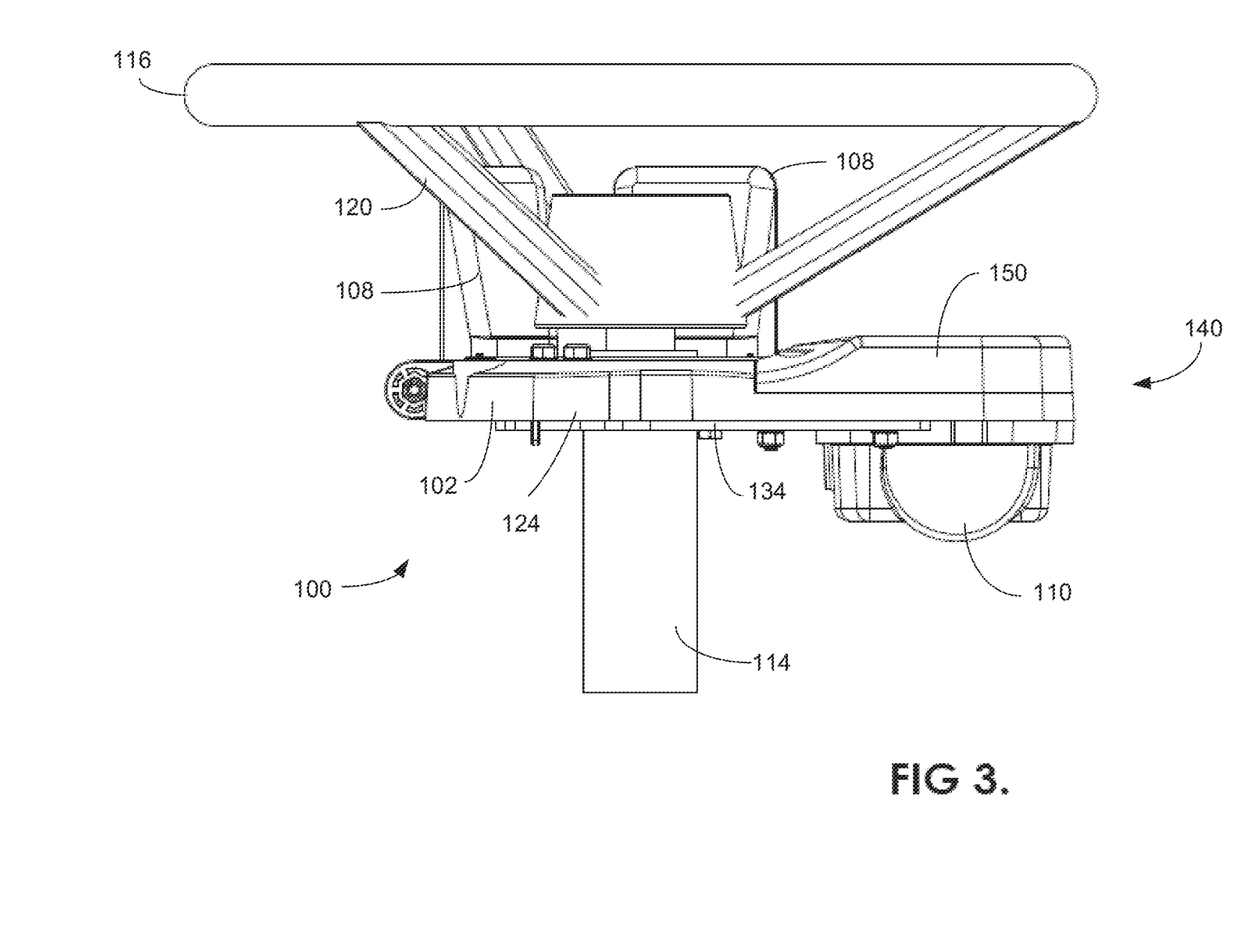
FIG. 3 is a side view of the steering wheel actuator of FIG. 1 mounted under a steering wheel.
Figure 4:
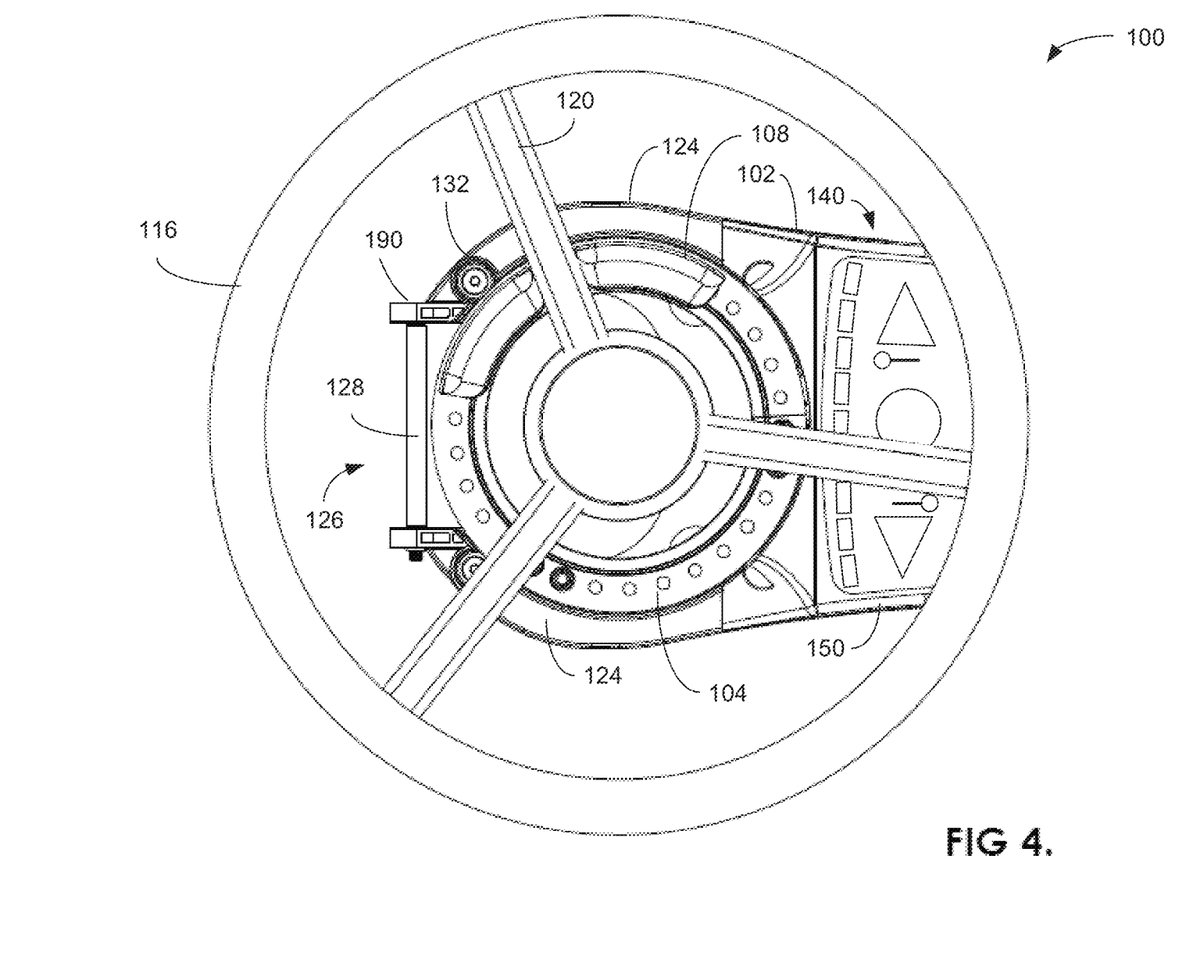
FIG. 4 is a top view of the steering wheel actuator of FIG. 1 mounted under a steering wheel.
Figure 5:
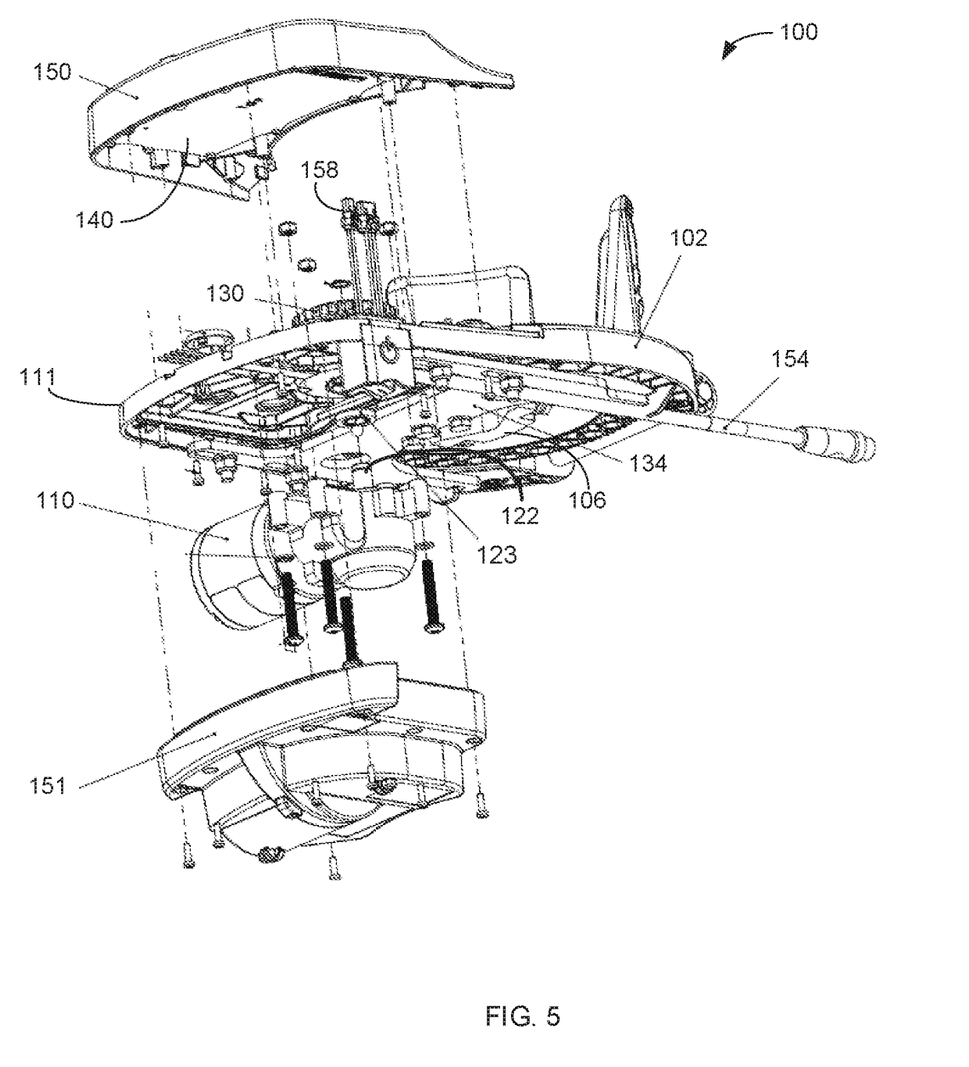
FIG. 5 is a bottom exploded perspective view of the steering wheel actuator of FIG. 1.

FIG. 1 shows an isolated perspective view of integrated steering actuator 100. FIG. 2 is a perspective view of actuator 100 mounted under steering wheel 116, FIG. 3 is a side view of actuator 100 mounted under steering wheel 116, FIG. 4 is a top view of actuator 100 mounted under steering wheel 116, and FIG. 5 is an exploded bottom perspective view of steering wheel actuator 100.

Referring to FIGS. 1-5, steering wheel actuator 100 includes an annular frame assembly 102 that supports a round rotating gear assembly 104. A clamp 106 may attach to a steering wheel column 114 and hold frame assembly 102 and gear assembly 104 below steering wheel 116. Actuators 108 are bolted to gear assembly 104 and extend vertically up between spokes 120 in steering wheel 116.

An enclosure 150 is integrally formed with frame assembly 102 and also may extend underneath steering wheel 116. Enclosure 150 may house a control system 140 that automatically steers the vehicle containing steering wheel 116. Control system 140 may control a motor 110 that rotates gear assembly 104 causing attached actuators 108 to turn steering wheel 116.

Frame assembly 102 may include oppositely opposing semi-circular arms 124 forming a circular center region 118 and a front opening 126 for receiving steering wheel column 114. A spacer 128 is located in opening 126 in between opposite front ends of arms 124. Gear assembly 104 seats into center region 118 and is rotationally held in-between arms 124 by bearings 132 that are located in four opposing quadrants of frame assembly 102.

Motor 110 may be a DC electric motor that includes a shaft 122 that extends up through a hole 123 formed in a back section 111 of frame assembly 102 and couples to a gear 130. Gear 130 sits in frame assembly section 111 and engages with teeth that extend around the lower outside perimeter of gear assembly 104.

A bracket 134 is bolted to the bottom of frame assembly 102 and attaches to clamp 106. Bracket 134 can be aligned so gear assembly 104 is concentrically aligned with steering wheel column 114. In one example, clamp 106 may be substantially co-planer with teeth in the lower layer of gear assembly 104. Recessing clamp 106 up into opening 130 reduces the overall depth of steering wheel actuator 100.

In one embodiment, actuator 100 is made fully out of plastic to reduce cost. In at least one embodiment, gear assembly 104 consists of a two-piece split design that allows installation without removing steering wheel 116. Operation and assembly of frame assembly 102 and actuators 108 is described in more detail in co-pending U.S. patent application Ser. No. 15/784,804 which has been incorporated by reference in its entirety.

Gear assembly 104 is just one example drive assembly that may couple motor 110 to an actuator 108 that turns steering wheel 116. It is understood that other types of drive assembly can be used to connect motor 110 to actuator 108 and/or steering wheel 116. For example, motor 110 may be coupled to a belt drive assembly or chain drive assembly that connects to a pulley or sprocket connected to actuators 108 or connected directly to the steering wheel shaft. In another example, the drive assembly may be a direct drive motor coupled directly to the steering wheel or steering wheel shaft.

Integrated Auto-Steer Control System

Control system 140 includes enclosure 150 that sits over the top of back section 111 and contains electronics and electrical connections for controlling motor 110 and operating a user interface 152. A bottom cover 151 sits over motor 110 and attaches to the back side of frame assembly back section 111. A power and control cable 154 includes the control and power lines used for powering and controlling motor 110 and control system 140. Connectors 158 in cable 154 plug into a printed circuit board contained in enclosure 150 that holds the electrical components of control system 140. Control system 140 contains a central processing unit, a motor controller, an inertial measurement unit (IMU), a global navigation satellite system (GNSS) receiver, and a GNSS antenna all integrated together inside of enclosure 150.

User interface 152 includes a center engage button 160A, a left set A button 160B, a right set B button 160C, and a light bar 166. Integrated buttons 160A-160C and light bar LEDs 166 form a simple user interface 152 for controlling actuator 100. Buttons 160A-160C engage auto-steering, disengage auto-steering, and set the starting point and end point of a new wayline in a field. Light bar 166 may indicate system status, power, error codes, and steering error relative to the desired ideal wayline in the field. The functionally of LEDs in light bar 166 is fully programmable and other modes of operations can be added.

Pressing middle button 160A may engage auto-steering transferring vehicle control to control system 140 so the operator can let go of steering wheel 116. Pressing button 160A again disengages the auto-steering. An operator presses set A button 160B to set the start coordinates for a a desired path for the vehicle (wayline) and presses the set B button 160C to set the ending coordinates of the wayline.

A and B buttons 160B and 160C, respectively, are also used during auto-steer to nudge the vehicle in the left or right direction when the vehicle is drifting off the set wayline. For example, a farm implement may pull the vehicle to the left off of the wayline. The operator may press set B button 160C to move the vehicle and towed implement slightly to the right.

The operator may grab the steering wheel at any time to disable auto-steer. For example, at the end of the wayline, the operator may grab the steering wheel and manually perform a U-turn to realign the vehicle with a next row on a field. The operator then presses center engage button 160A to re-engage auto-steer.

Light bar 166 may provide diagnostics identifying power status, GPS status, motor faults, IMU status, etc. Light bar 166 also may indicate how far the vehicle is off the current wayline. For example, light emitting diodes (LEDs) in light bar 166 are activated on the left or right of a center LED to indicate how far the vehicle is off the wayline to the left or right, respectively.

Figure 6:
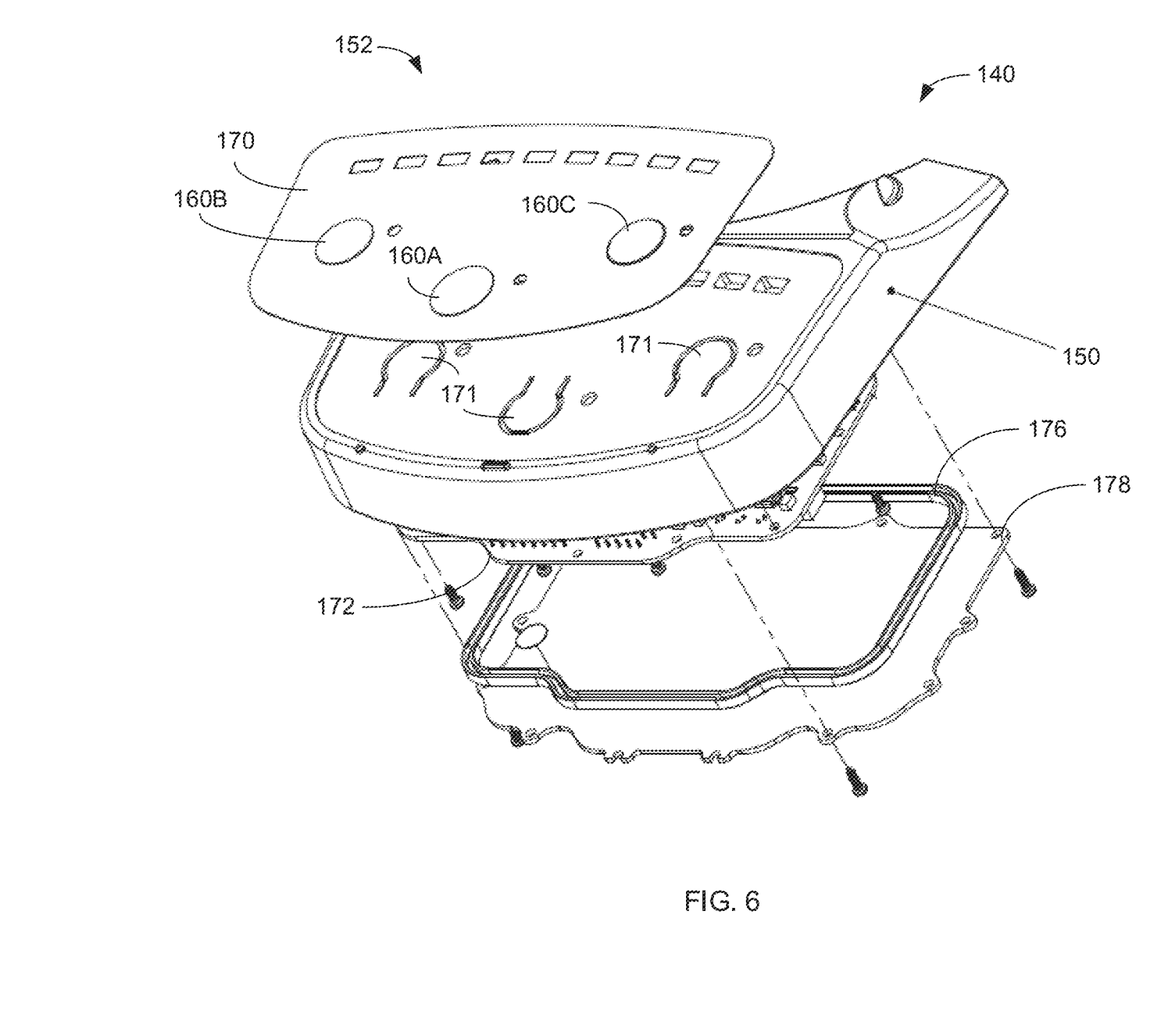
FIG. 6 is a top exploded perspective view of a control system integrated into the steering wheel actuator.
Figure 7:
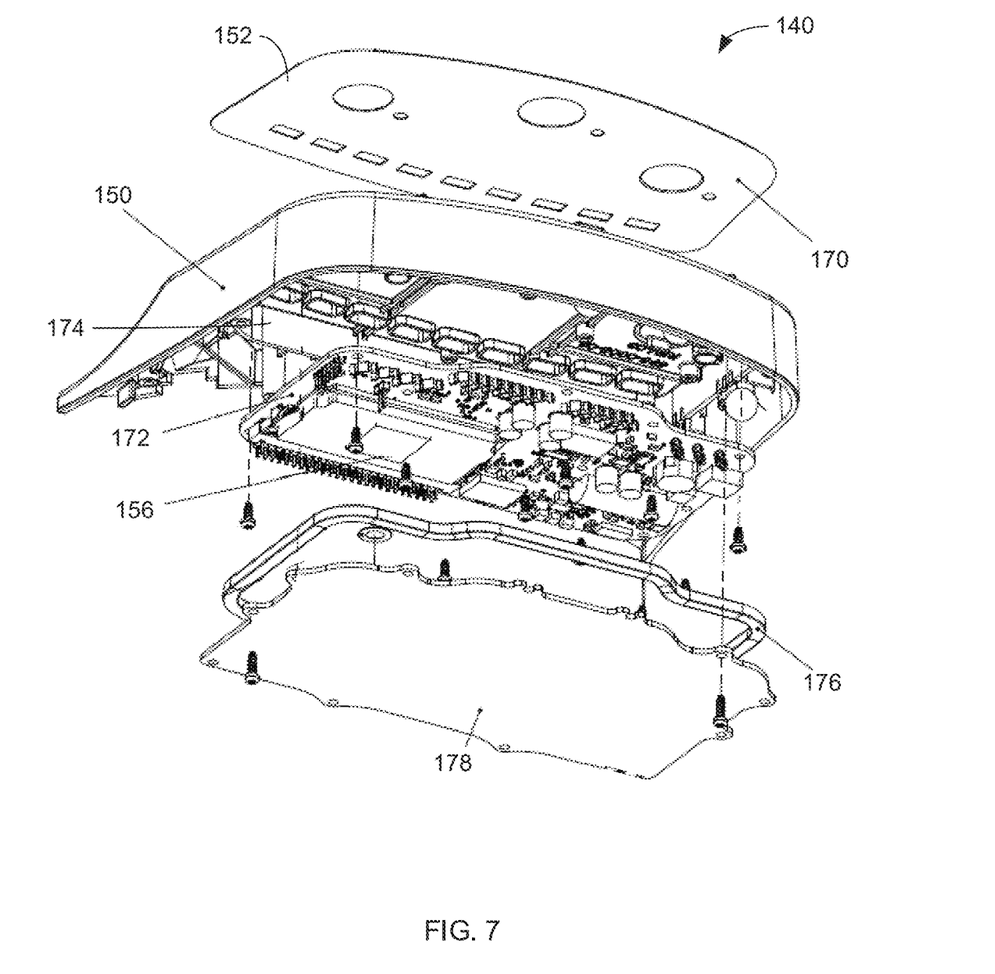
FIG. 7 is a bottom exploded perspective view of the control system and user interface.

FIG. 6 is an exploded top perspective view of control system 140 and FIG. 7 is an exploded bottom perspective view of control system 140. Referring to FIGS. 6 and 7, in one example, user interface 152 may include a flexible mat or screen 170 that lays on top of button actuators 171 formed on the top surface of enclosure 150. Different locations on mat 170 operate as buttons 160A, 160B, and 160C and are located over associated actuators 171.

A printed circuit board (PCB) 172 seats up inside of a wall 174 that extends down from the top surface of enclosure 150. A gasket 176 is shaped to extend around the perimeter of printed circuit board (PCB) 172 and seat up into a bottom end of wall 174. A cover 178 attaches to enclosure 150 pressing up against gasket 176 and providing a watertight seal around PCB 172. The entire enclosure 150 may be waterproof and drive assembly 104 may be the only exposed moving element.

Figure 8A:
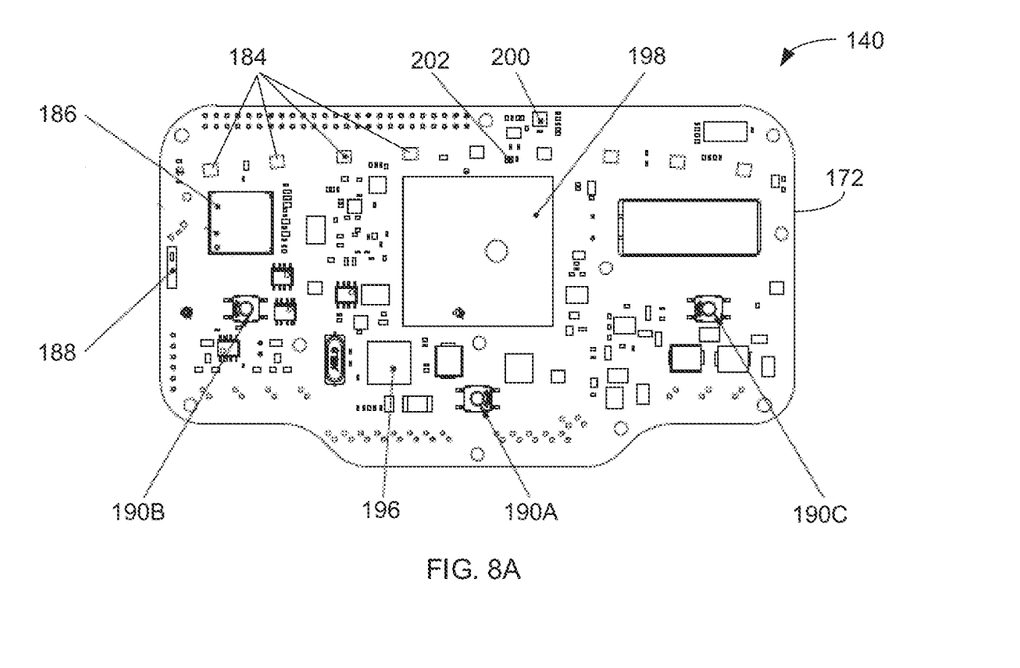
FIG. 8A is a top plan view of a printed circuit board for the control system.
Figure 8B:
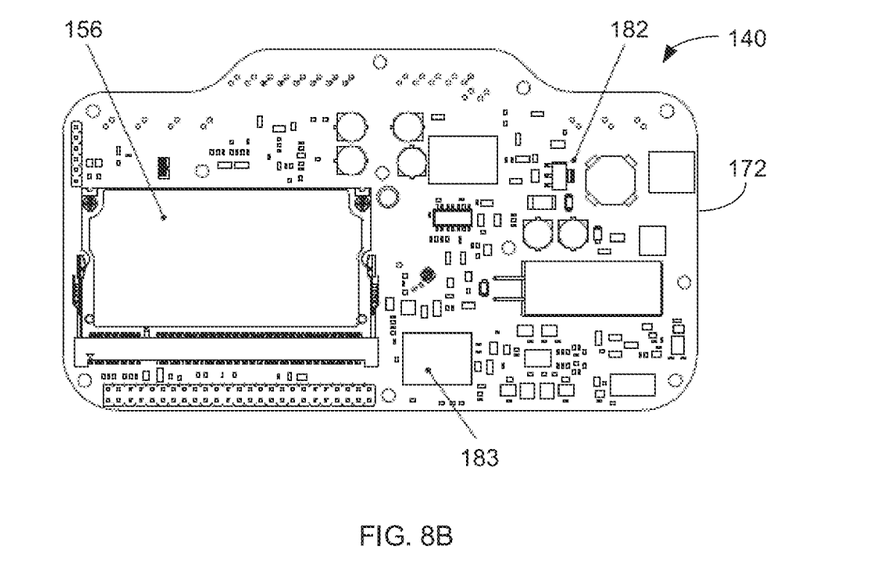
FIG. 8B is a bottom plan view of the printed circuit board for the control system.

FIG. 8A shows a top plan view of PCB 172 and FIG. 8B shows a bottom plan view of PCB 172. The top side of PCB 172 includes multiple LEDs 184 that form light bar 166 shown above in FIG. 1. Multiple push button switches 190A, 190B, and 190C are mounted on PCB 172 and activate in response to depressed buttons 160A, 160B, and 160C, respectively, on user interface 152 as shown above in FIG. 6.

Liquid crystal diodes (LCDs), an LCD screen, a touch screen, or any other type of display and input device may be used instead of LEDs 184. Other types of switches or input devices may be used based on the type of user interface. For example, user interface 152 may use a touch screen with capacitive sensors instead of switches 190.

Wi-Fi and Bluetooth® transceivers 186 operate within a same integrated circuit and are coupled to a Wi-Fi and Bluetooth® antenna 188. A GNSS antenna 198 is coupled to a GNSS receiver 183 mounted on the back side of PCB 172. GNSS is alternatively referred to as global positioning system (GPS). An inertial measurement unit (IMU) IC 200 and compass IC 202 are also mounted to the top of PCB 172. IMU 200 may include an integrated accelerometer and gyroscope. A power conditioning circuit 182 generates, conditions, and filters the voltages used by the ICs mounted on PCB 172.

Control unit 156 is connected to substantially all of the ICs on PCB 172 and is alternatively referred to as a main central processing unit (CPU). CPU 156 operates as a steering controller for automatically steering the vehicle based on a stored destination path, and inputs from GNSS receiver 183, compass 202, IMU 200, Bluetooth/Wi-Fi 186, and push button switches 190A, 190B, and 190C. Control unit 156 sends commands to a motor controller 196 for controlling motor 110 and steering wheel 116. The CPU 156 may use control software to determine the vehicle position for controlling the motor and automatically steering the vehicle.

Steering control systems that automatically steer vehicles using GPS/IMU technology over defined paths are described in U.S. Pat. No. 7,142,956, issued Nov. 28, 2006, entitled: AUTOMATIC STEERING SYSTEM AND METHOD; U.S. Pat. No. 7,689,354, issued Mar. 30, 2010, entitled ADAPTIVE GUIDANCE SYSTEM AND METHOD; U.S. Pat. No. 7,835,832, Nov. 16, 2010, entitled: VEHICLE CONTROL SYSTEM; and U.S. Pat. No. 7,437,230, issued Oct. 14, 2008, entitled: SATELLITE BASED VEHICLE GUIDANCE CONTROL IN STRAIGHT AND CONTOUR MODES, which are all herein incorporated by reference in their entireties.

Normally a user interface is a separate expensive touchscreen display connected by cables to the steering wheel actuator. Electronic control units (ECUs) with inertial sensors are also usually sold as a separate expensive devices that connect to steering actuators with electrical harnesses.

Control system 140 and user interface 152 are uniquely integrated into steering wheel actuator 100 to achieve a lower overall system cost. Control system 140 uses a same enclosure 150 to hold CPU 156, GNSS receiver 183, and the accelerometers and gyros of IMU 200 used for terrain compensation and closed loop steering control. Control system 140 integrates the ECU/steering controller 156 into steering actuator 100 providing an easy to install and use cost effective design.

In one example, control system 140 is integrated on a single PCB 172. In other examples, multiple PCBs located within enclosure 150 may retain different components of control system 140. Other components of actuator 100 are connected to PCB 172 via wires, cables or alternative physical attachments.

Figure 9:
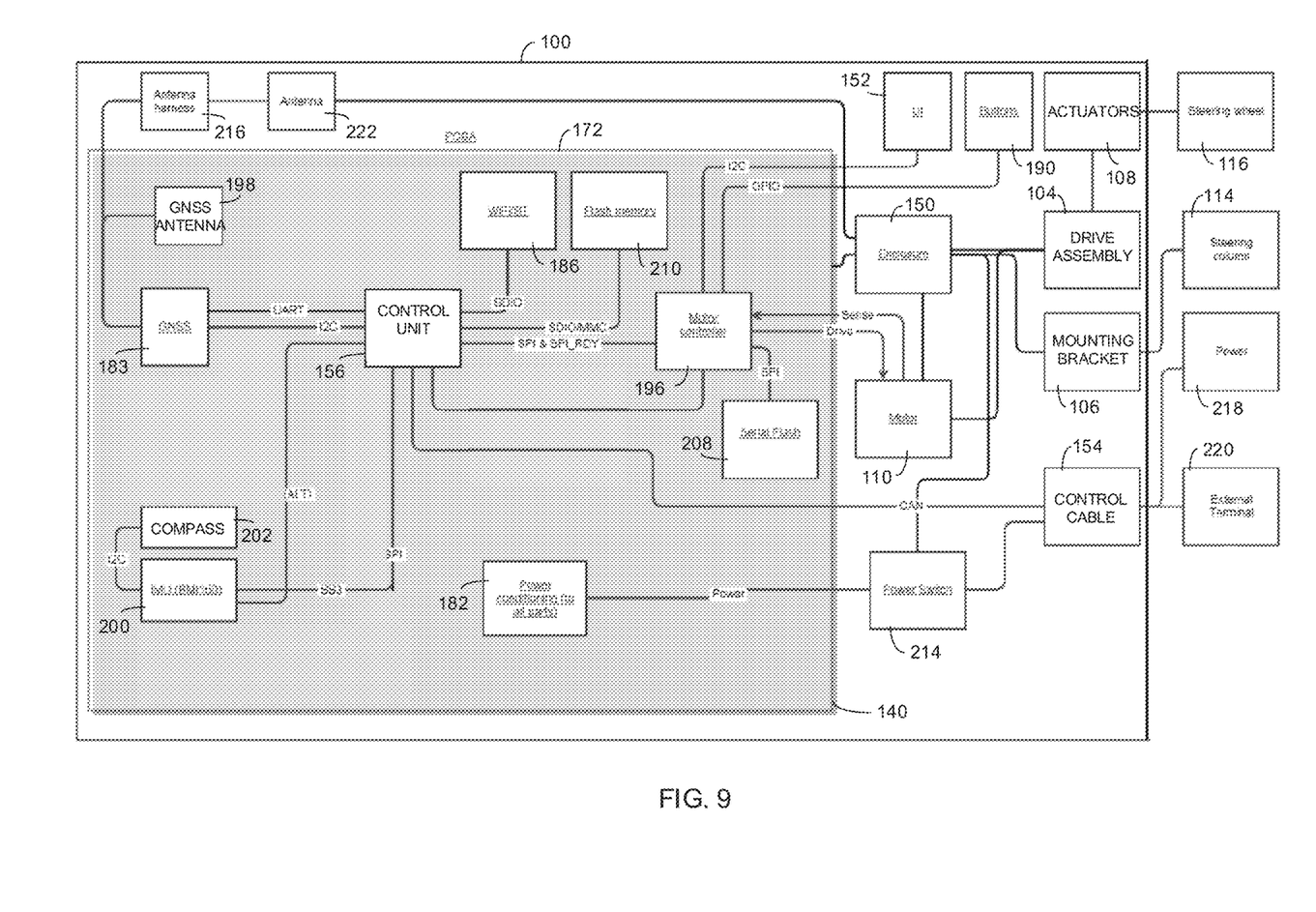
FIG. 9 is a schematic diagram of the control system.

FIG. 9 is a schematic diagram showing how different devices in steering wheel actuator 100 are connected together on a vehicle. As described above, steering wheel actuator 100 includes a mounting bracket and clamp 106 that attaches enclosure 150 to steering column 114. Actuators 108 are connected to drive assembly 104 and extend up in-between the spokes of steering wheel 116 to steer the vehicle. As explained above, drive assembly 104 may be a gear assembly, belt drive assembly, chain drive assembly, or a direct dive motor.

Control and power cable 154 in actuator 100 is coupled to a power supply 218, such as the vehicle battery. Control cable 154 may include a wiring harness that runs down steering column 114 to the vehicle floorboard to connect to an external terminal 220. A power switch 214 connects power from control cable 154 to power conditioning circuit 182 located on PCB 172.

Enclosure 150 retains control system 140, and buttons 190 of user interface 152. Enclosure 150 also may retain motor 110 and power switch 214. Enclosure 150 is also attached via frame assembly 102 in FIG. 1 to mounting bracket 106, gear assembly 104, actuators 108, and control cable 154 as shown above.

Control unit 156 receives position, speed, heading, yaw, roll, pitch, etc. from GNSS receiver 183, compass 202, and IMU 200. GNSS antenna 198 is connected to GNSS receiver 183 and is mounted directly on PCB 172. Mounting GNSS antenna 198 on PCB 172 may improve strength of GNSS signals received by GNSS receiver 183. An antenna harness 216 may connect an external antenna 222 located outside of enclosure 150 to GNSS receiver 183.

Control unit 156 may store configuration data, location data, and selected waylines in Flash memories 210 and 208. Control unit 156 reads the position and heading data from GNSS receiver 183, compass 202, and IMU 200 and reads the wayline coordinates in memories 210 and 208 to determine where the vehicle is currently located and where the vehicle needs to be located. Control unit 156 sends signals to motor controller 196 to turn the vehicle to the right or left based on the current vehicle location relative to the stored wayline.

Motor controller 196 controls motor 110 and actuates the LEDs in user interface 152 based on inputs received from buttons 190 and the inputs received from control unit 156. In a simplified configuration, motor 110 and user interface 152 may be operated only by motor controller 196 without the auto-steer functionality provided by control unit 156. Control unit 156 also may be controlled by a wireless device, such as a smart phone, IPAD, PC, etc. via Wi-Fi/Bluetooth® transceivers 186.

Thus, auto-steer components are integrated into a same enclosure 150 within steering wheel actuator 100. For example, GNSS antenna 198, GNSS receiver 183, IMU 200, control unit 156, and user interface 152 are all located within enclosure 150 mounted on steering column 114 instead of in separate enclosures located on separate vehicle locations. Thus, steering wheel actuator 100 with integrated control system 140 provides a complete auto-steer system that is less expensive to manufacture and easier to install.

For the sake of convenience, operations may be described as various interconnected or coupled functional blocks or diagrams. However, there may be cases where these functional blocks or diagrams may be equivalently aggregated into a single logic device, program or operation with unclear boundaries.

Some of the operations described above may be implemented in software and other operations may be implemented in hardware. One or more of the operations, processes, or methods described herein may be performed by an apparatus, device, or system similar to those as described herein and with reference to the illustrated figures.

It will be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A steering wheel actuator for mounting on a steering wheel column and turning a steering wheel of a vehicle, comprising:
   an enclosure formed onto the steering wheel actuator;
   a central processing unit (CPU) located in the enclosure configured to automatically steer the vehicle; and
   a user interface located on the enclosure configured to control the CPU, the user interface including a display screen or mat integrally formed on a top face of the enclosure and operably coupled to the CPU to control engagement and disengagement of auto-steering by the steering wheel actuator, set starting and ending points for a wayline, and display a steering error relative to the wayline.

2. The steering wheel actuator of claim 1, further comprising:
   a global navigation satellite system (GNSS) antenna located in the enclosure; and
   a GNSS receiver located in the enclosure and coupled to the GNSS antenna and the CPU.

3. The steering wheel actuator of claim 2, further comprising an inertial measurement unit (IMU) including an accelerometer and a gyroscope located in the enclosure and coupled to the CPU.

4. The steering wheel actuator of claim 3, wherein the CPU, GNSS antenna, GNSS receiver, and IMU are all mounted on one or more printed circuit boards located in the enclosure.

5. The steering wheel actuator of claim 1, wherein the user interface includes one or more buttons and light emitting diodes (LEDs).

6. The steering wheel actuator of claim 1, wherein the user interface includes a light bar with a string of programmable LEDs that identify the steering error relative to the wayline and system status.

7. The steering wheel actuator of claim 1, further comprising:
   a frame assembly including a central opening to extend around the steering wheel column, wherein the enclosure is integrally formed with the frame assembly;
   a gear assembly configured to insert into and rotate within the central opening in the frame assembly;
   a motor configured to rotate the gear assembly based on control signals generated by the CPU and the user interface.

8. The steering wheel actuator of claim 7, further comprising a motor controller located in the enclosure and coupled between the CPU and the motor, the motor controller configured to send control signals to the motor based on the control signals generated by the CPU and the user interface.

9. The steering wheel actuator of claim 7, wherein the enclosure extends back from the frame assembly underneath the steering wheel.

10. An apparatus for controlling a steering wheel attached on an end of a steering wheel column, the apparatus comprising:
    a frame assembly configured to mount on a sidewall of the steering wheel column below the steering wheel on the end of the steering wheel column, wherein the frame assembly is separately attachable to the steering wheel column, with respect to the steering wheel;
    a drive assembly located in the frame assembly;
    a motor coupled to the drive assembly; and
    a control system attached to the frame assembly including a user interface and a motor controller, the motor controller sending commands to the motor to turn the steering wheel based on inputs received from the user interface.

11. The apparatus of claim 10, including an enclosure extending from the frame assembly retaining the user interface and an internal space housing the motor controller.

12. The apparatus of claim 10, wherein the control system includes:
    a global navigation satellite system (GNSS) antenna;
    a GNSS receiver coupled to the GNSS antenna; and
    a central processing unit (CPU) coupled to the motor controller and the GNSS receiver.

13. The apparatus of claim 12, wherein the control system includes an inertial measurement unit (IMU) coupled to the CPU.

14. The apparatus of claim 13, including an enclosure extending from the frame assembly and containing one or more printed circuit boards coupled to the control system.

15. The apparatus of claim 13, wherein the CPU sends commands to the motor controller to control the motor based on signals received from the GNSS receiver and the IMU.

16. The apparatus of claim 15, wherein the control system includes a memory to store wayline coordinates, the CPU sending the commands to the motor controller based on a position and heading signals received from the GNSS receiver and the IMU relative to the wayline coordinates.

17. The apparatus of claim 10, wherein the drive assembly includes at least one of a gear assembly, belt drive assembly, chain drive assembly, or direct drive motor.

18. The apparatus of claim 10, wherein the user interface includes one or more buttons, light emitting diodes (LEDs), a liquid crystal display (LCD), or a touch screen.

19. The apparatus of claim 10, including a wireless transceiver for wireless communication with an external device.

20. The apparatus of claim 10, wherein the frame assembly is attached to a clamp, wherein the frame assembly is configured to mount to the sidewall of the steering wheel column using the clamp.

21. A method for steering a vehicle having a steering wheel column with steering wheel mount for coupling a steering wheel to an end of the steering wheel column, the method comprising:
attaching a steering wheel actuator to a section of a sidewall of the steering wheel column, wherein the section of the sidewall of the steering wheel column is located below the steering wheel mount on the end of the steering wheel column, the steering wheel actuator including a motor for rotating the steering wheel and an enclosure; and
operating a control system in the enclosure to control the motor and automatically steer the vehicle.

22. The method of claim 21, wherein the steering wheel actuator includes a drive assembly coupled to the motor for rotating the steering wheel.

23. The method of claim 21, further comprising:
receiving global navigation satellite system (GNSS) signals from a GNSS antenna and GNSS receiver located in the enclosure; and
automatically steering the vehicle based on the GNSS signals.

24. The method of claim 21, further comprising:
receiving inertial measurement unit (IMU) signals from an IMU located in the enclosure; and
automatically steering the vehicle based on the IMU signals.

25. The method of claim 21, further comprising:
receiving user input signals from a user interface located on the enclosure; and
automatically steering the vehicle based on the user input signals.

26. The method of claim 25, wherein the user interface includes one or more buttons, light emitting diodes (LEDs), a liquid crystal display (LCD), or a touch screen.

27. The method of claim 21, including using a central processing unit and control software in the control system to control the motor and automatically steer the vehicle.

* * * * *